United States Patent [19]

Kolz

[11] Patent Number: 5,460,123
[45] Date of Patent: Oct. 24, 1995

[54] ELECTROSHOCK REPULSION OF WATERFOWL, AQUATIC ANIMALS, AND SMALL MAMMALS

[75] Inventor: Lawrence Kolz, Lakewood, Colo.

[73] Assignee: The United States of America as represented by the Department of Agriculture, Washington, D.C.

[21] Appl. No.: 51,428

[22] Filed: Apr. 23, 1993

[51] Int. Cl.⁶ .......................... A01K 61/00; A01K 79/02
[52] U.S. Cl. ............... 119/220; 340/852; 405/127
[58] Field of Search .................. 119/219, 220, 119/174; 307/106, 107, 108; 405/81, 127; 340/852; 43/17.1; 362/183

[56] References Cited

U.S. PATENT DOCUMENTS

| | | | |
|---|---|---|---|
| 4,081,289 | 3/1978 | Campbell, III | 126/271 |
| 4,539,516 | 9/1985 | Thompson | 320/48 |
| 4,563,727 | 1/1986 | Curiel | 362/183 |
| 5,041,952 | 8/1991 | Janda et al. | 362/183 |
| 5,222,458 | 6/1993 | Pippy | 119/219 |

FOREIGN PATENT DOCUMENTS

| | | | |
|---|---|---|---|
| 2530986 | 1/1977 | Germany | 43/17.1 |
| 1248497 | 10/1989 | Japan | 119/220 |
| 493215 | 2/1976 | U.S.S.R. | 43/17.1 |
| 535930 | 1/1977 | U.S.S.R. | 119/220 |
| 1106462 | 8/1984 | U.S.S.R. | 119/220 |

*Primary Examiner*—Todd E. Manahan
*Attorney, Agent, or Firm*—Howard Silverstein; Samuel Shipkovitz; Glenna Hendricks

[57] ABSTRACT

The present invention comprises apparatus designed to repel, but not injure, warm-blooded aquatic life from a specific aquatic region in an energy-efficient manner. A potential gradient is turned on and maintained between sets of immersed electrodes in response to the detection of the presence of warm-blooded animals in the "watched" volume at the surface and above and below the surface of an aquatic region. The electroshock is applied to the animal through the water by use of an electrical field generated from an array of electrodes placed in the water. The size, shape, and intensity of the electrical field are independently controlled by use of design criteria which allow the operator to determine the degree of electrical shock to be administered to a specific animal species by controlling the parameters of electrical energy induced into the animal through the water.

15 Claims, 11 Drawing Sheets

ELECTROSHOCK REPULSION OF WATERFOWL, AQUATIC ANIMALS, AND SMALL MAMMALS

BACKGROUND OF THE INVENTION

While fish, ducks, beavers, and various other animals either live in, or make frequent natural use of rivers, lakes, and streams, there are many occasions when their presence is not desired. Beavers are a very destructive breed of mammal and can chew up many trees and vegetation that are stream or river-based in a short time. For similar reasons muskrats, Norway rats, and occasionally even ducks, geese, and birds are desired to NOT be in certain zones. Sometimes, it is even desired to keep certain fish out of specific aquatic areas or zones. The problem, simply presented, is how to repel these animals warm blooded species, fish, et al. from a certain zone, or depth of water in said zone, in an automatic manner without causing them permanent physiological harm.

The instant inventor's solution to this problem is to apply his previous theories of scientifically-based levels of "safely" electroshocking specific species while in the water of said zone/volume in conjunction with sensors to detect these species when they enter the zone/volume of water to be protected. For example, warm-blooded animals can be detected by sensitive infrared means and cold blooded animals may be detected with ultrasonic sensors. In this manner the power/electrical energy needed to repel the "undesired" animal will be conserved to that used only when said animal is detected in the "to-be-repelled-from" or "protected" zone. The volume of water actually electrified can be controlled through the design and configuration of the electrode arrays. The physical size of the conductive electrodes can be also used as an additional control to limit the magnitudes of the power densities developed in the water.

Prior art related to electrofishing and similar electrical energy applied to volumes of water to have a desired non-lethal effect on fish and other aquatic animals includes:
Kolz, A. L. 1989, "A Power Transfer Theory for Electrofishing", in *Electrofishing, A Power Related Phenomenon*, U.S. Fish & Wildlife Service Tech. Report 22(1989),pp 1–11;
Kolz, A. L. Reynolds, J. B., 1989, "Determination of Power Threshold Response Curves", Ibid pp. 15–24.
Other related publications include:
Kirkpichenko, M. Ya, V. P. Mikheev, & E. P. Shtern, 1963, "Action of Electric Current on Dreissena polymorpha larvae and planktonic crustaceans with short Exposures", Akad. Navk SSSR, Moscow, 1963, pp. 76–80.
Shentiakov, V. A., 1961, "Deistvie elektricheskogo toku promyshlennoi chastoty na kolonii Dreissena", Biull. Int. biol. vodokhr. AN SSSR, No.10.

Also see U.S. Pat. No. 5,289,133, "power Density Methods for Electroshocking" by the same inventor (filed Jan. 19, 1993 as Ser. No. 08/5966 as divisional of Ser. No. 677,930 filed Apr. 1, 1991, now U.S. Pat. No. 5,202,638).", has been deleted.

The intensity of the electrical shock received by an animal immersed in water is determined by the magnitude of the electrical power density present in the water and the effective conductivity of the animal (Kolz, 1989)). In general, the electroshock response of an animal progresses through the stages of mild irritation, extreme agitation, electronarcosis (stunned), tetany, and death, as the intensity of the electrical field is increased.

In the following table, Table I, are listed the approximate thresholds of power density for the three electroshock responses of excitation, stun, and death, as reported by various researchers for three species of fish, two species of mussels, Norway rats, mallard ducks, and Canadian geese. Except for the goldfish data shown in FIG. 1 (as measured by Kolz & Reynolds (1989), these data are extrapolated from isolated and fragmentary experiments, and the values listed in said Table are only indicative of a relative magnitude and not an absolute value. Nonetheless, the information is presented in order to show how these electroshock responses can be used to develop animal control devices.

The power density thresholds for all of the animals listed in said Table indicate that the animals are excited and disturbed by the electrical energy at power density levels much lower than that required to stun or kill the animals. This knowledge is the basis for the invention's concepts relating to the development of electroshock techniques to control animals. Animals will simply not colonize or remain in a zone/area where they are made physically uncomfortable. In the experiments with fish, ducks, geese, beaver and Norway rats, the animals escaped from the electrical fields as quickly as possible. The only animals to remain in the electrical fields were those that were incapacitated by muscular tetany or actually stunned by the electroshock effects. These data support the premise that animals can be controlled without serious injuries or harmful effects using electroshock. The methods taught are certainly more acceptable to the general public than control methods that result in lethal effects.

The Kolz research disclosed here teaches that the use of alternating current polarity waveform is considered more desirable for warm blooded animal repulsion than direct current or pulsed direct current waveforms at different levels of power density although direct current waveforms can be used. A power density of about 120 microwatts per cubic centimeter was determined to be adequate to disrupt the behavior of Norway rats and cause them to be repelled. The beaver is a larger member of the same Rodentia class as the Norway rat and is repelled in a similar manner. Aquatic birds, such as ducks and geese, are also repelled by electrical fields in water even though the bird's feathers partially insulate the birds from full and direct electrical contact with the water.

Electrified water barriers will protect waterways and impounding structures (such as headgates and dams) from damage caused by aquatic mammals, protect crops (such as rice paddies) from rodent damage, protect waterfowl from predators, and protect grain storage facilities from rodent infestation.

The electroshocking repulsion system is advantageous because it is only activated (turned on) when a target warm-blooded animal is detected by an appropriate sensor such as an infrared detector. Cold-blooded animals could be detected by appropriate sensors such as ultrasonic devices, an interrupted light beam, or a pressure transducer. The electroshock is applied to the animal through the water by means of an electrical field that is generated from an array of electrodes. The size, shape, and intensity of the electrical field(s) are independently controlled under determined criteria to cause specific animal repulsion or tetanization, although fatal effects could also be engineered if desired.

PRIOR ART

The field of electroshocking per se is not new. For example, U.S. Pat. No. 2,709,984 to Marks discloses a screen incorporating a self-contained light source. It is provided to show state and history of the art.

U.S. Pat. No. 3,822,403 to Coleman shows a device that provides an electromagnetic field in the water to repel sharks for protecting animals from sharks. The device would not be appropriate for purpose of the invention.

U.S. Pat. No. 4,211,980 to Stowell teaches a device for use in salt water. The control devices are of interest. However, the device does not work in the same manner as the invention disclosed herein.

U.S. Pat. Nos. 4,580,528 and 4,593,648 to Marzluf disclose and claim use of devices that electrify water zones to chase fish. The patent does not disclose that the device controls animals in the manner taught herein.

U.S. Pat. No. 4,750,451 to Smith discloses a device that causes an electric fish barrier composed of an electrode array that results in electrical pulsations in the water.

U.S. Pat. No. 4,825,810 to Sharber discloses and claims a device that works in the manner of the invention of Kolz. The barrier is not disclosed as appropriate for use to discourage animals.

GB 2,153,164 A of *Moore*, a publication of a patent application in Britain, discloses an electric barrier that protects goldfish from cats, herons, and other predators. The barrier employs a fence rather than electrically charged water barrier.

While the references discuss repelling aquatic life, none teach the preservation of other life and conservation of energy achieved by having the repelling electric energy turned on only in conjunction with and under the control of a detector which will detect the presence of the type of life to be repelled in the area and volume to be free from the targeted type of life.

SUMMARY OF THE INVENTION

The present invention comprises apparatus designed to repel, but not injure, warm-blooded aquatic life from a specific aquatic region in an energy-efficient manner. A potential gradient is turned on and maintained between sets of immersed electrodes in response to the detection of the presence of warm-blooded animals in the "watched" volume at the surface and above and below the surface of an aquatic region. The electroshock is applied to the animal through the water by means of an electrical field generated from an array of electrodes placed in the water. The size, shape, and intensity of the electrical field are independently controlled by use of design criteria which allow the operator to determine the degree of electrical shock to be administered to an animal by controlling the electrical energy induced into the animal through the water to induce the effects of repulsion, tetanization, or death. (Though death is usually not the desired result, and can be avoided by means disclosed herein.) The scientifically predetermined (for each species) gradient is turned on when a sensor detects the presence of the animal in the "protected region", which must include at least a surface of water so that the animal will be shocked through the electrified water. Contrary to most methods using electrified barriers for control of animals, this system does not require the animal to make direct contact with the shocking apparatus.

The detector of warm-blooded animals of common use today is that of the infrared sensor. The need for mobility requires that the sensor operate on a low power budget. Safety controls are designed into the equipment by using specialized timing and delays in the electronic controls. Other detectors such as motion detectors, mechanical switches, light beams, magnetically operated switches, or pressure sensors could also be utilized for this purpose.

Portable equipment is designed using DC to AC power inverters as the primary electroshocking power source. Additionally, a timer control could be used to provide a duty cycle of applied electrode voltage, thus allowing energy conservation/battery life preservation. The sensor, inverter, timer for a delayed reset, and all apparatus other than the leads to the electrode are usually contained in a water-tight but heat radiative package such as a ruggedized, water-resistant package.

The electrified water barriers are designed to impose only a minimal hazard to humans. The shocking device, once activated, stays on for a set period of time and, when an electroshock cycle is completed, will not turn on (reset) until the field of view is clear of a target animal for a period of time. The technique ensures that an animal cannot be "over-shocked".

It is, accordingly, a principle objective of the present invention to provide a safe and controlled electroshocking method for expelling and repelling animals that are traversing through or attempting to occupy a particular aquatic region that requires protection.

Another objective of the invention is to provide a system that will conserve electrical energy by only having the repelling system energized when the target animal is detected in the water region to be protected.

Yet another objective of the invention is to conserve electrical energy by having the electrical energy of the repelling system energized to the electrodes on a controlled-duty-cycle basis.

Another objective of the invention is to provide a portable, animal-repelling system that operates in an optimal fashion for an extended battery life under field conditions.

Other objectives and features of the present invention will become apparent from following the detailed description when taken in conjunction with the drawings.

DESCRIPTION OF THE DRAWINGS

Table I enumerates the power density thresholds for various types of animals and with respect to various effects on each said animal.

DETAILED DESCRIPTION OF THE INVENTION

Figure 1:
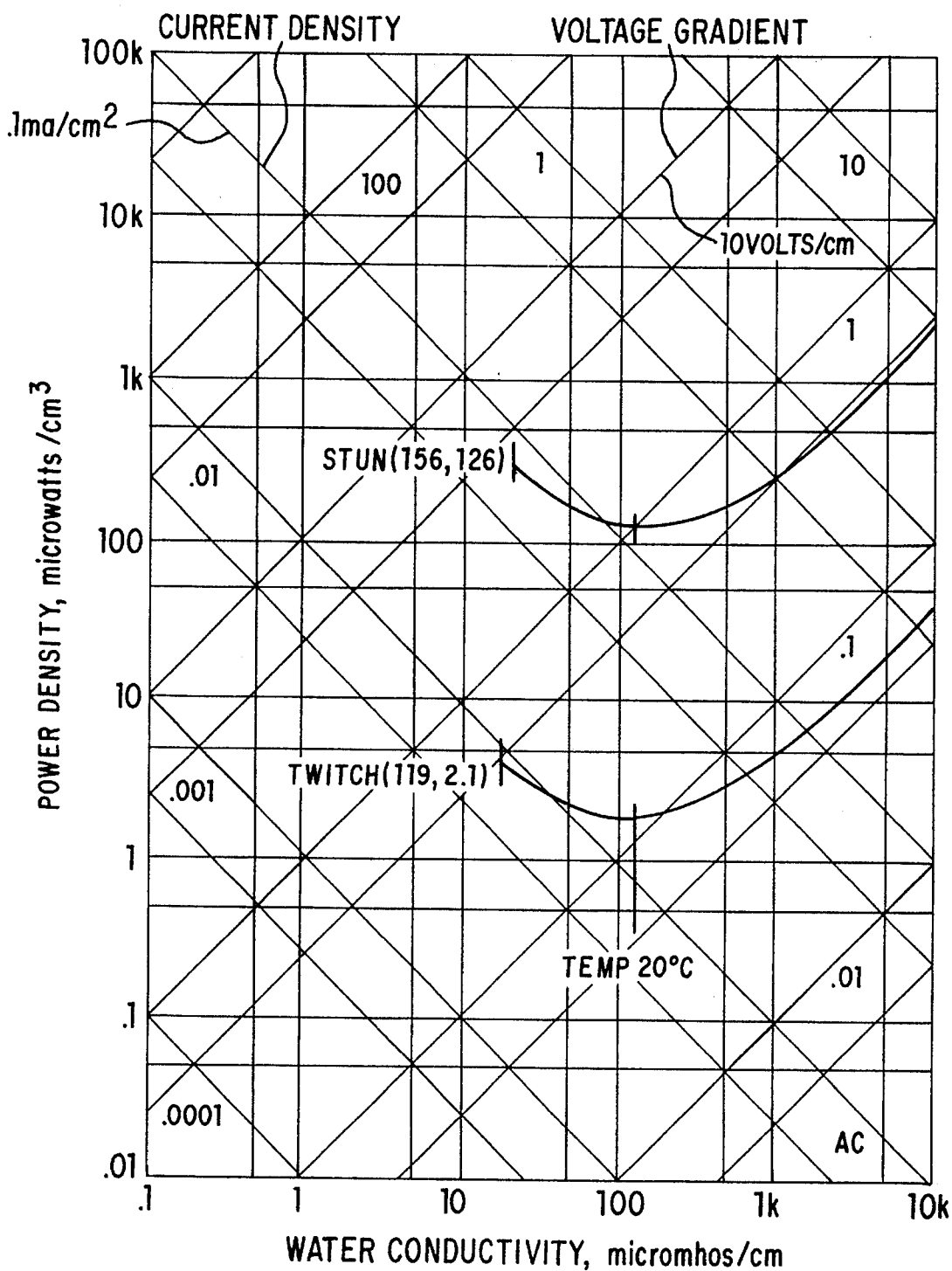
FIG. 1 charts the electroshock response of goldfish to an AC waveform.

All animals immersed in water are vulnerable to the effects of electrical shock, since there are no natural defenses. Electrical shock can be an irresistible training stimulus as evidenced by how quickly livestock exposed to electric fences develop avoidance patterns. This same principle applies to in-water electrical barriers that are designed to control the higher order vertebrates: waterfowl and mammals. One would not expect any "learned" response from invertebrates or reptiles, and for these animals, the electrified controls must be developed to take advantage of the immediate and short-term behavioral responses.

The intensity of an electroshock applied through water can be controlled by adjusting the electrical power density in the water. This control allows an organism to be stimulated into various states of excitation. Fish are known to react in a definite stimulation sequence as the intensity of the electric field is increased; namely, mild irritation, extreme agitation, electrotaxis (with DC voltage), electronarcosis, tetany, and death. For electrofishing, two rules-of-thumb are generally applied: 1) small fish are less susceptible to electrical shock than large fish, and 2) heavily scaled fish (like carp or bass) are more difficult to shock than lightly scaled fish (like trout or catfish). Size and physical characteristics of an animal (i.e., including effective electrical conductivity) affect its sensitivity to electrical shock.

Laboratory techniques reported by Kolz and Reynolds (1989, Ibid) demonstrated methods to measure and then predict the power density thresholds necessary to stimulate fish into a particular state of electroshock for any magnitude of water conductivity. This empirical approach is based upon concepts developed from electrical circuit theory. In order to electroshock an animal in water, the electrical energy must be transferred from the water into the organism. The efficiency of this energy transfer is controlled by the electrical conductivity of the water and the effective conductivity of the animal. (Kolz, Ibid, 1989). Kolz and Reynolds concluded that the threshold response for fish conforms to an electrical model wherein the power transferred into the fish is adjusted to remain constant regardless of the conductivity of the water. Previously it was believed that the electrical conductivity of the water somehow influences the threshold of sensitivity of the fish. The conductivity of the water does, however, control the amount of power transferred into the fish. These same electrical principles developed for electrofishing are believed extendible to mammals, birds, reptiles and invertebrates. Beaver are often named as the most destructive mammal in the United States, and measures to control these mammals generally involves trapping and removal (dead or alive). Electroshocking techniques offer new solutions.

Pilot experiments have been conducted at the U.S. Denver Wildlife Research Center to demonstrate the repellant effects of electroshock on ducks, geese, beavers and Norway rats. The devices associated with the instant invention built to control warm-blooded animals use infrared sensors to energize the electrical fields only at those times when said animals are present. The invention only operates when an animal is detected within a certain target zone, including at least a water surface. Furthermore, the equipment can, optionally, be disabled by sensors that detect the presence of human personnel that have approached the site by any route considered unlikely for the target species. Although the infrared detector is exemplified, the instant invention can also be practiced using sensory technology based upon pressure, vibration, sound, light, etc.

It is established in electrofishing literature that low frequency alternating current waveforms are more damaging to fish than direct current. Kirppichenko (Ibid, 1963) reports that a 50 Hz. AC waveform was more effective in killing zebra mussels than either DC or 427 Hz AC.

FIG. 1, electroshock response of goldfish to an AC waveform, shows two electroshock responses as measured for goldfish by Kolz and Reynolds, Ibid, 1989. The "U" shaped response curves were predicted by Kolz based upon electrical theory and the concept of transferring a constant amount of power into the fish through water having various values of water conductivity. The "U" curves can be defined by mathematical expressions if the coordinates of the minima are known. These coordinates basically measure the effective conductivity of the animal and the threshold of power density sensitivity for the organism. These concepts are new to the biological community, and there is little relevant information available in the literature regarding power density thresholds.

Table I summarizes the approximate thresholds of power density for the three electroshock responses of excitation, stunning, and death as reported by various researchers for three species of fish, two species of mussels, Norway rats, mallard ducks, and Canadian geese. Except for the (actual) goldfish data, these data are extrapolated from isolated and fragmentary experiments and the values listed are only indicative of a relative magnitude and not an absolute value. The information is presented in order to demonstrate how electroshock responses can be used to develop animal control devices.

The power density thresholds for all of the animals listed in Table I indicate that the animals are excited and disturbed by the electrical energy at power density levels much lower than that required to stun or kill the animals. Animals will not remain in an area where they are made physically uncomfortable. The inventor has observed that in experiments with fish, ducks, geese, beaver and Norway rats the animals escaped from the electrical fields as quickly as possible. The only animals to remain in the electrical fields were those that were incapacitated by muscular tetany or actually stunned by the effects of electroshock.

Figure 2:
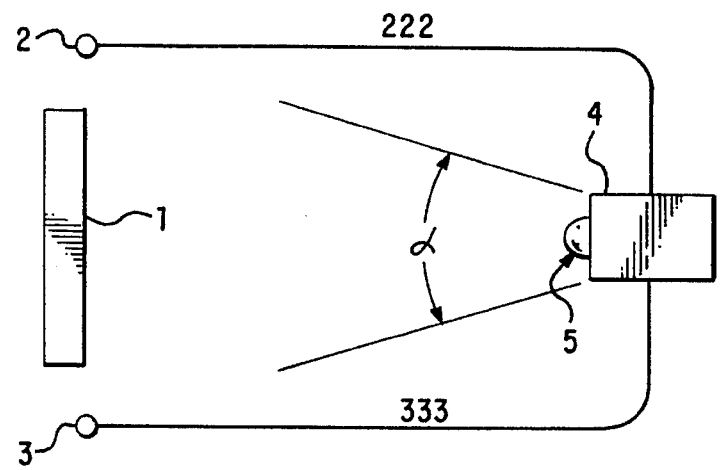
FIG. 2 is a plan view of an aquatic area/zone wherein at least one pair of electrodes are immersed in water.
Figure 3:
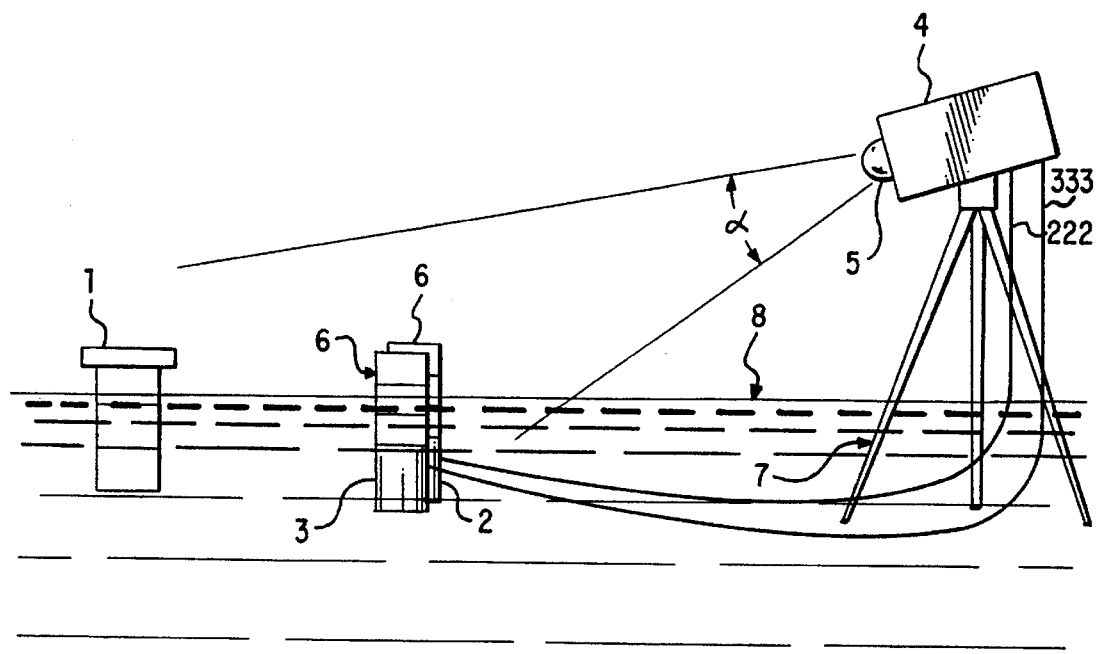
FIG. 3 shows an elevational view of the diagram in FIG. 2.
Figure 4:
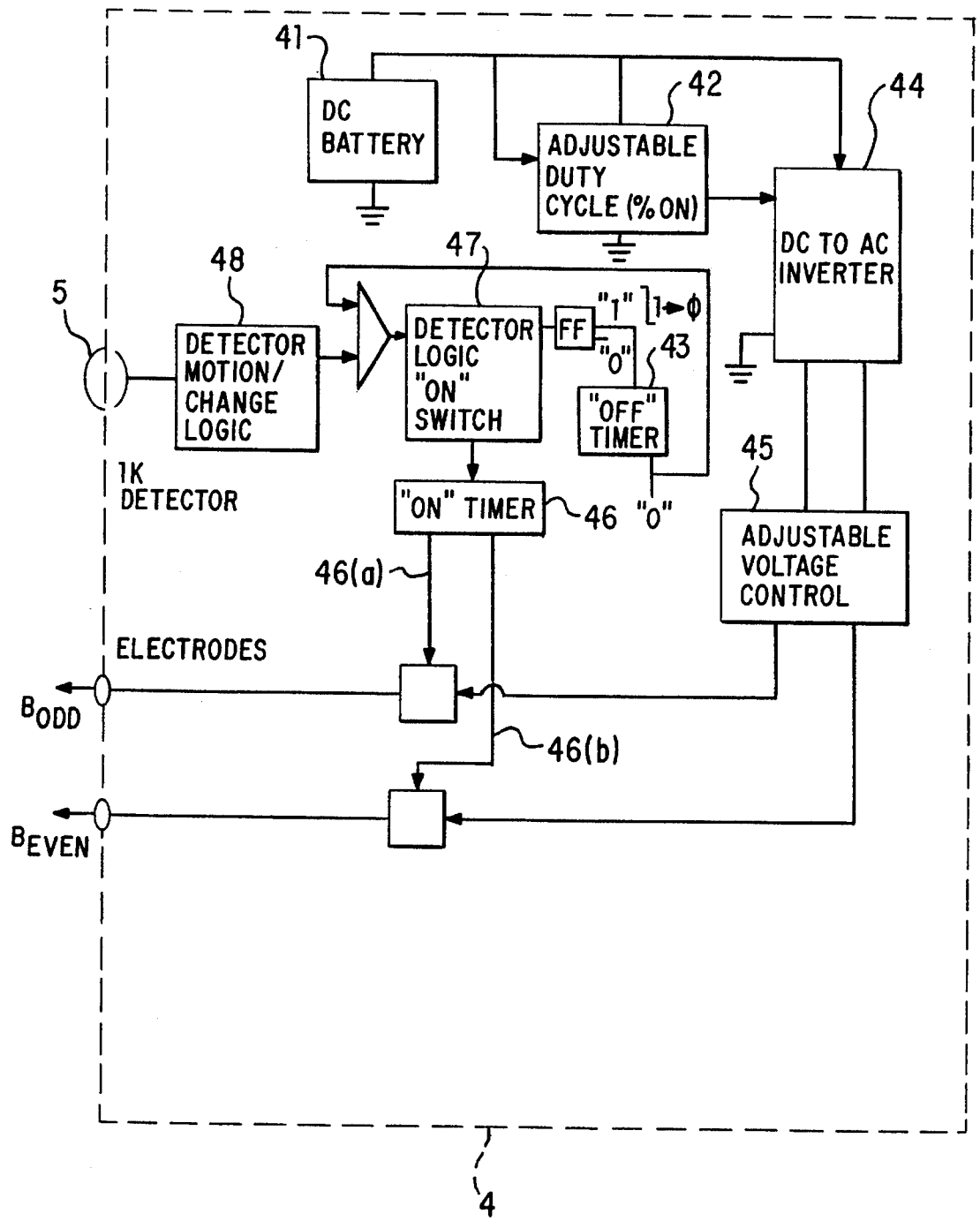
FIG. 4 shows a typical block diagram of the logic associated with the invention.

A preferred embodiment is described in FIGS. 2–4. FIG. 2 is a plan view of an area wherein at least one pair of electrodes, 2,3 are immersed in water. 1 which is optional or, in some cases undesired, is a bait platform placed near or between the electrodes and usually at the elevational surface of the water. Electrodes 2,3 are connected to Box 4, and sensor/detector 5, is also electrically connected to Box 4, and may physically be primarily within Box 4, which may be watertight and heat radiative. A tripod or other support means 7 holds up Box 4 in position. The waterline is shown at 8.

FIG. 3 shows an elevational view of the diagram in FIG. 2 where Blocks 6, represents non-conductive support to stabilize the position of an electrode.

FIG. 4 shows a typical block diagram of the logic associated with the invention. Note here that the power is a DC battery 41, the duty cycle device 42 (% of time ON) is adjustable by associated means 45, 46, the DC voltage amplitude applied and the ON time applied are also adjustable, and that some form of OFF-timer 43 (animal no longer in detection) operates to prevent the apparatus from reapplying the electroshock until no animal is detected for a (pre)selected period of time. Parts 47, 48 produce, at each output, the multiplication (logically) of the switch function 46 timer output with the voltage outputs from 45. Parts 47 and 48 may operate as a combined cooperative multiplexer with two outputs.

The flip flop is input to the "1" side and is fed into "OFF" timer 43. The "0" output of said timer is input to an "AND" gate Which is ANDed with the output of detector/motion/ change logic 48 to produce input to detector logic "ON" switch 47. Detector logic "ON" switch 47 turns on "ON" timer 46 for a pre-set amount of time. It may optionally, with 2 outputs, have some form of multiplexer so that multiple electrodes may time-share the energy or a multiplexer may be associated with 46(a) and 46 (b) operating cooperatively.

Figure 4A:
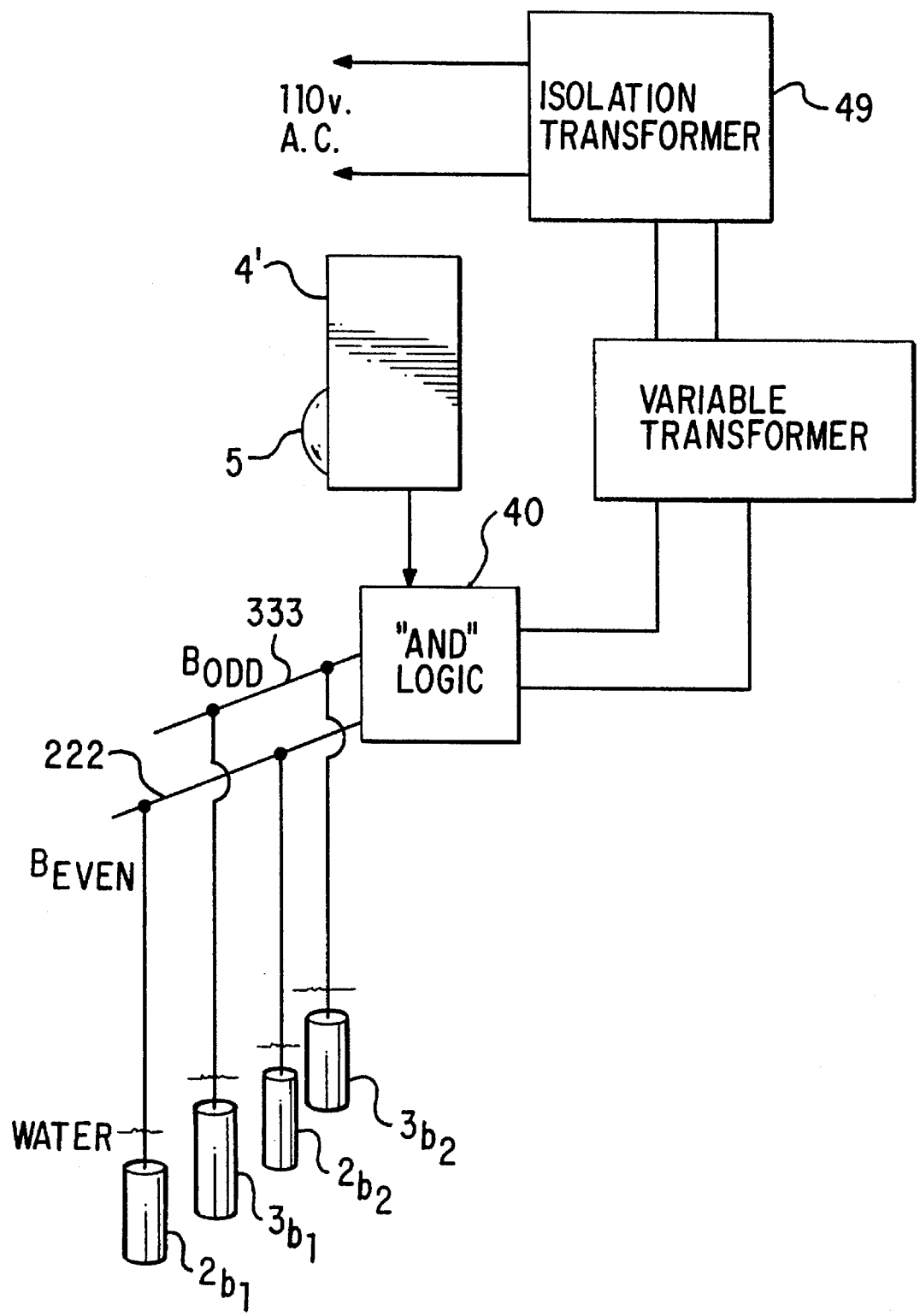
FIG. 4A shows the invention incorporating an isolation transformer and a multiplexer.

FIG. 4A shows the use of an isolation transformer 49 interposed between normal utility company AC lines and the rest of the invention. Also, a multiplexer block 40 can be utilized to time share the electroshocking energy between various sets of electrodes. (See FIG. 8). Line 222($B_{even}$) and Line 333($B_{odd}$) are such outputs of Block 40 and have sets of electrodes $^2b_1$, $^2b_2$, . . . and $^3b_1$, $^3b_2$, . . . respectively.

Figure 5:
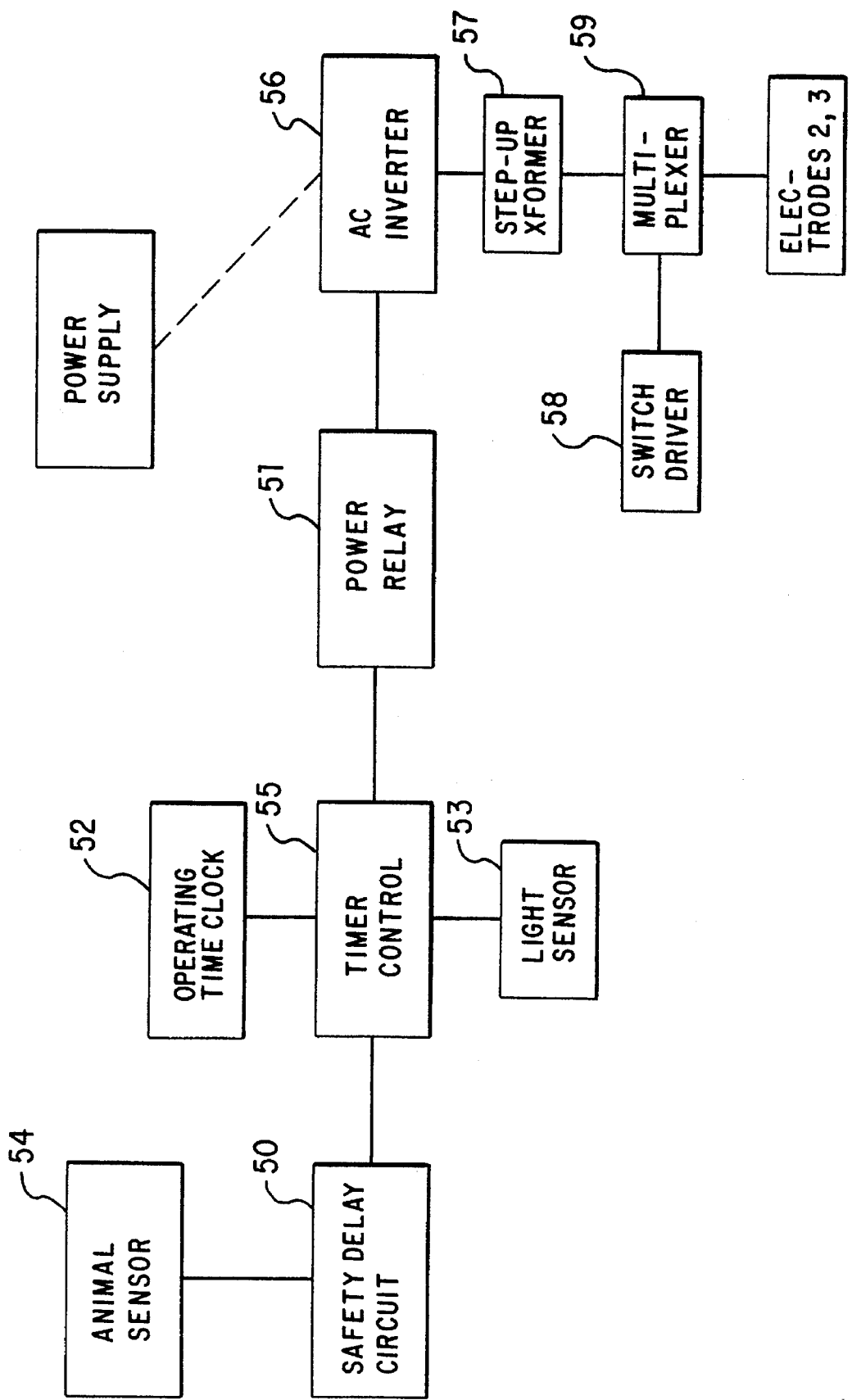
FIG. 5 shows an embodiment of the invention utilizing a delay circuit to prevent restart of electroshocking until no animal sense signals are received for a specified period of time.

FIG. 5 shows a different but typical block diagram of the system in accordance with the invention. Here, the "OFF-timer" is generically described as a "Safety Delay Circuit" 50. A "Power Relay 51" with an adjustable time of 30 seconds to 5 minutes (determined by $R_1$ $C_1$ of FIG. 9) is a high current switch that activates the AC inverter 56 of FIG. 5 for the period of the adjustable time and then the Power Relay 51 breaks contact. Animal sensor 54 is connected to Safety Delay Circuit 50. AC inverter 56 is connected to Step-Up Transformer 57 which in turn is connected to an input of Multiplexor 59. Switch driver 58 is also an input to Multiplexor 59. Operating Time Clock 52 and said Safety Delay Circuit are inputs to Timer Control 55 as is optional light sensor 53. Said timer control 55 outputs to Power Relay 51.

An "operating-time clock" 52 keeps track of the cumulative time that the power is applied to the electrodes and also the time that the "Power Relay" switches contact for each cycle of usage.

Figure 6:
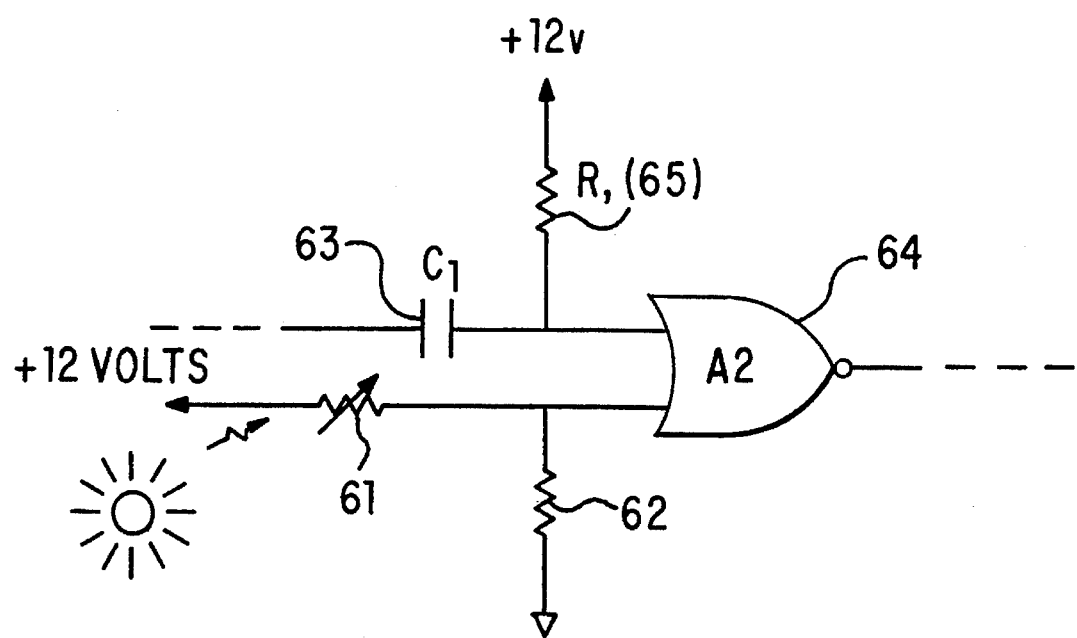
FIG. 6 discloses the invention including a light sensor to deactivate the electroshocker during daylight when nocturnal animals such as beavers are rarely in target areas.

It should be noted that beavers are nocturnal animals and do most of their foraging and damage under low light conditions. Therefore, to conserve battery power, it is wise to add a light sensitive control 53 that prevents the electroshocking apparatus from operating during daylight. FIG. 6 indicates how a light sensor can be incorporated to deactivate the electroshocker during the day by utilizing a photo-and-bias resistor 61, 62 to control the operation of 64 gate A2. The associated time constant is determined by the resistance of 65(R1) and the capacitance of 63(C1). A bias resistor 62 is required.

Figure 7A:
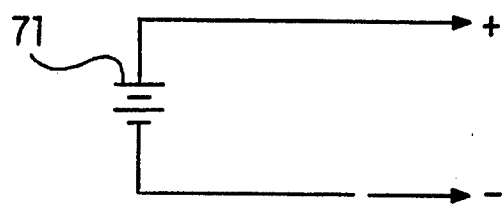
FIG. 7A shows the invention incorporating a rechargeable battery supply.
Figure 7B:
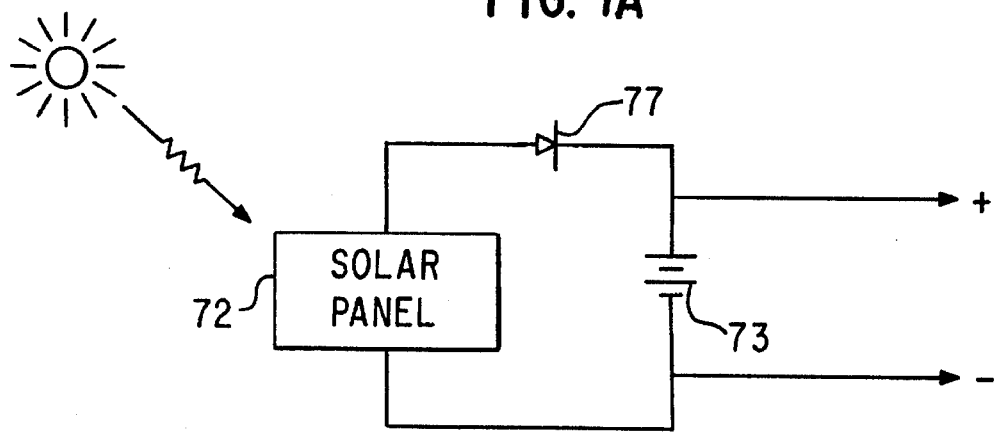
FIG. 7B shows the invention incorporating a rechargeable battery with solar panel.
Figure 7C:
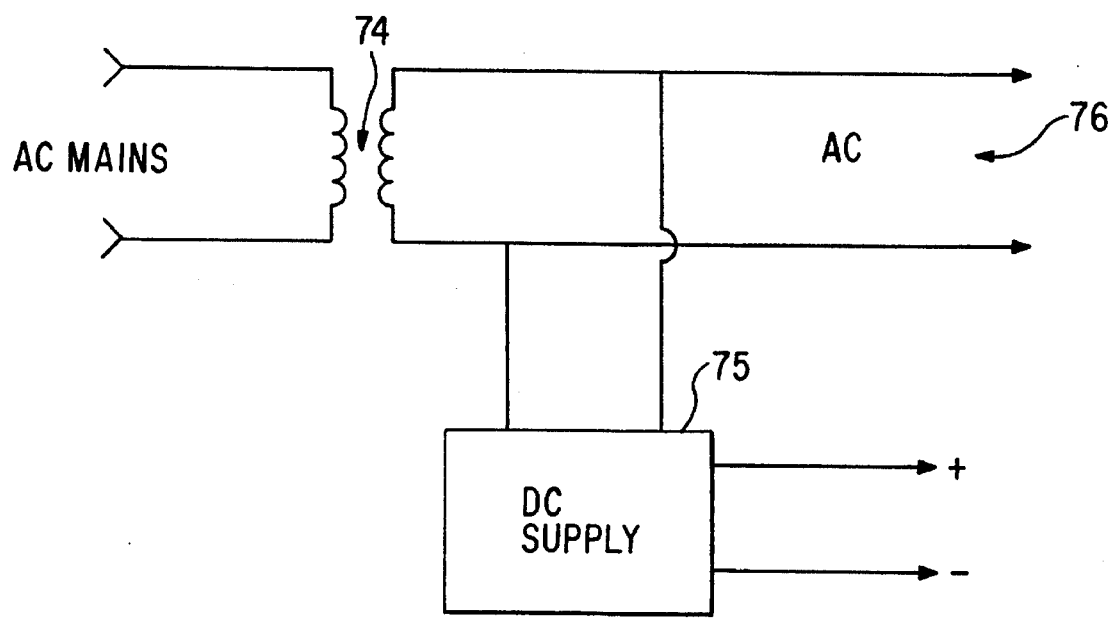
FIG. 7C shows the invention incorporating an isolation transformer from a normal utility AC line.

The power supply must be capable of producing the wattage necessary to energize the appropriate electrical field. Depending on the configuration, conductivity of the water, conductivity of the animal, number of electrodes to be simultaneously powered, and other factors, the power requirement might range from hundreds to thousands of watts. Various methods of providing such power are available and are suggested in FIGS. 7A–7C. A first embodiment consists of a primary or rechargeable DC battery, 71, which is exchanged for a fully charged one as shown in FIG. 7A (Primary or rechargeable battery supply). Said battery 71 usually ranging from 12 to 48 volts. A second embodiment is to use a solar panel 72 to continuously recharge the batteries 73 in the field as shown in FIG. 7B (Rechargeable battery with solar panel). An isolation diode 77 is connected between the solar panel 72 and the battery 73. For high power applications, the apparatus would be connected directly to AC mains as shown in FIG. 7C (operation from AC mains) using an isolation transformer 74 and an AC-to-DC rectifier/filter 75 to provide the DC for the control circuits and the AC, 76, for electroshocking. With AC power, the inverter is no longer required, but an isolation transformer is recommended for the safety of personnel.

Although an infrared detector is shown as the target animal detector, there are many methods available to sense the presence of an animal, including the use of photocells and light beams, tilt switches, pressure switches, treadles, magnetic reed switches, body-capacitance switches, proximity switches, vibration sensors, etc. that could be used. Also potentially useful are the combination of a time-domain reflectometer and parallel-wire transmission line to monitor the exact location of animal (beaver) activity. The infrared sensor represents an economical approach. The apparatus is intended, in one embodiment, to operate with any sensor that provides a momentary switch closure.

The AC inverter shown can be, for example, a 200 watt inverter such as the "Power Star". For high power applications, a 1000 watt static inverter such as manufactured by AVION IV Instruments, Inc. could be utilized. The advantage of more power is to obtain a wider area of coverage and to operate in water having a high value of electrical conductivity. For operation in low conductivity water, step-up transformers as shown in FIG. 5 would be needed. The higher voltage offers the advantage of more effective shocking and a larger area of coverage under special water conditions. Unfortunately, such transformers also create a lethal hazard for the animals, which is undesired, if the equipment is misused.

Figure 8:
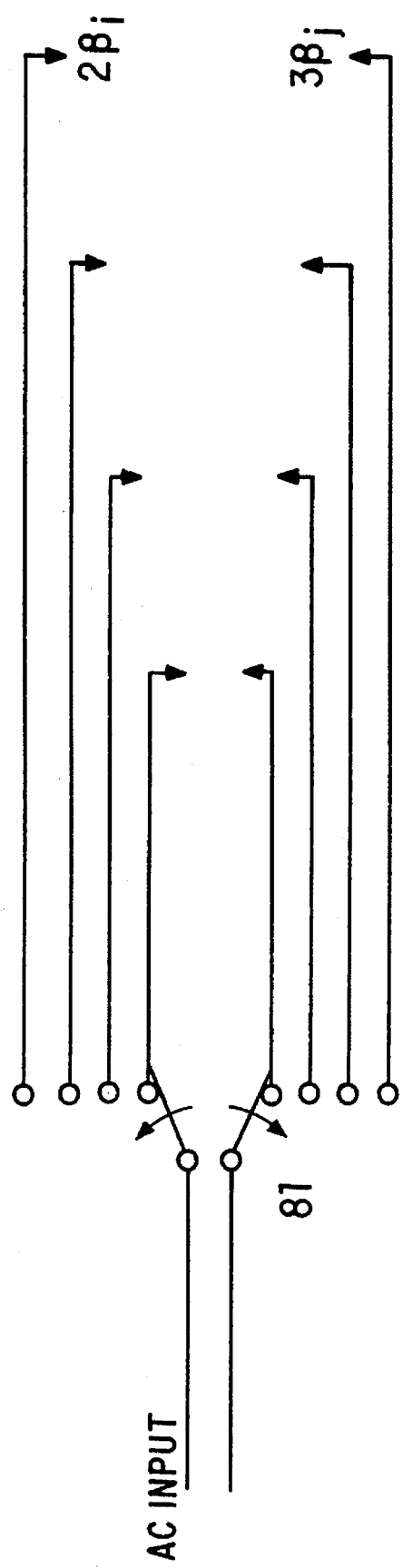
FIG. 8 shows the invention incorporating an electrode multiplexer.

The multiplexer 59 shown in FIG. 5 offers the advantage of sending power (in a non-simultaneous manner) to a number of electrodes without having to increase the power requirements of the inverter. Pairs of electrodes Pair 1, Pair 2, Pair 3, Pair 4 can be time-multiplexed with a switching relay 81 as shown in FIG. 8 (Electrode Multiplexer). A switch driver consisting of an astable oscillator and monostable oscillator would be necessary to activate the switching relay at rates of the order of every 15 to 30 seconds.

In order to concentrate the electrical field at the surface of the water, the configuration of the electrodes is a significant design factor for the electroshocking apparatus. Short vertical cylinders or small diameter horizontal cylinders are appropriate configurations.

Figure 9:
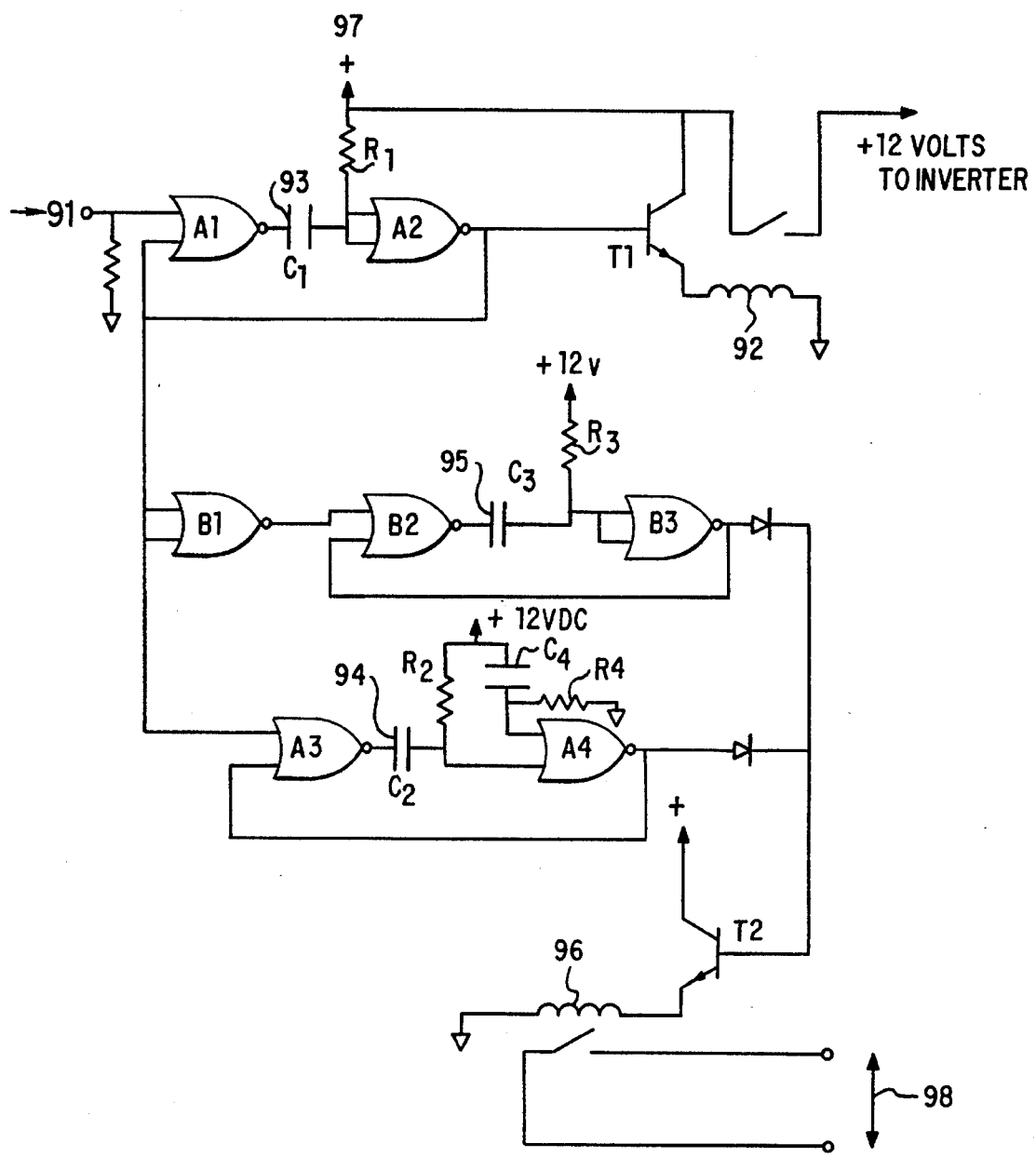
FIG. 9 shows the invention incorporating a specific circuit to control the electroshocker and an accumulation timer, where an animal sensor signal reset delay circuit is built into the animal sensor circuit, such as the Visonic infrared sensor.
Figure 10:
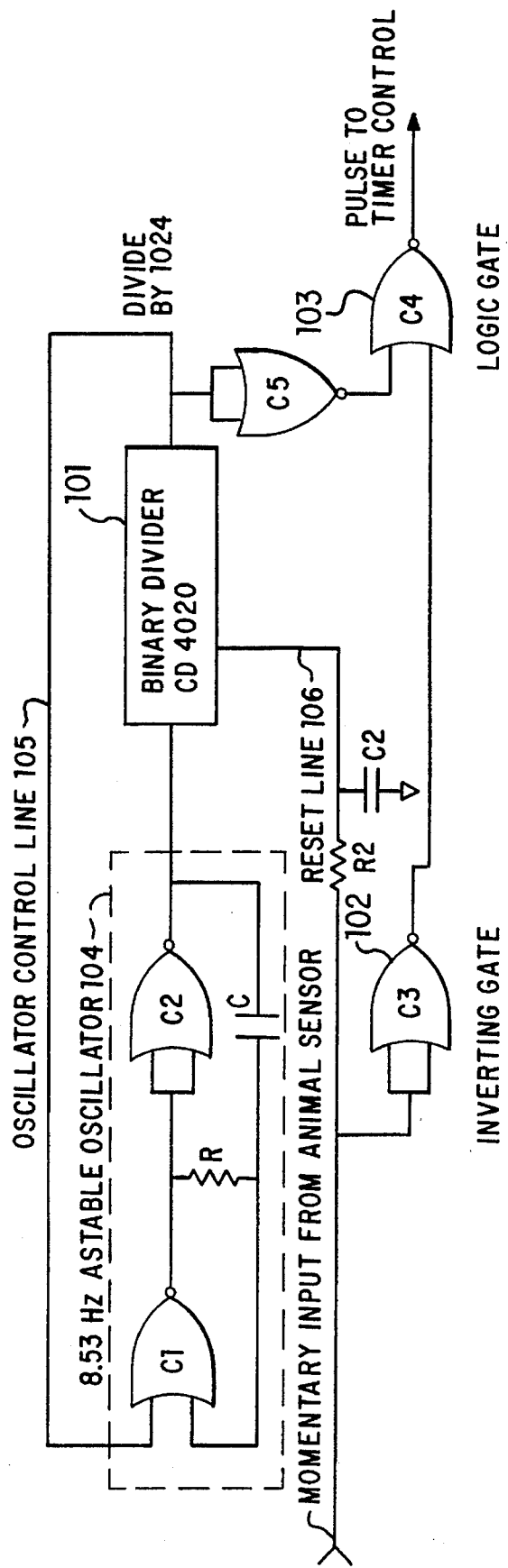
FIG. 10 shows a typical animal sense signal safety delay circuit.

Turning to FIG. 9, the timer control portion of an embodiment of the electroshocking invention, it is seen that, in principal, the electroshocking device is turned on when the infrared sensor 5, detects an animal and outputs a signal at 91 (Trigger from IR detector). This signal is then used to activate the power relay 92 to apply power to the inverter and to generate the AC voltage on the electrodes. In this figure are shown three monostable oscillators 93, 94, 95, each of which requires two pair of NOR gates: A1/A2, A3/A4, and B2/B3. The output of each monostable is an electrical pulse, and the duration of these pulses are controlled by the selection of the resistor and capacitor combination $R_1C_1$, $R_2C_2$, and $R_3C_3$ respectively. In conjunction with this figure, we presume that the IR detector box has some built-in reset algorithm circuit. If not, a typical such reset mechanism will be described later in FIG. 10 for use therewith (as shown in FIG. 9). In operation, an output signal from the IR detector causes the monostable 93 A1/A2 to generate an output pulse having a specific amplitude, usually 12 volts in modern circuitry. The output of A1/A2 drives first transistor $T_1$ (NPN) into conduction (the source side of Resistor $R_1$ connected, in one embodiment, to a 12 volt DC battery 97) and causes the Power Relay 92 (Relay 1) to activate. The switch closure of this relay then causes a voltage to be applied to the inverter and then the electroshocking apparatus becomes fully operational. The $R_1C_1$ values are selected to keep the device operating for 0.5 to 5 minutes and the apparatus then automatically turns off.

The pulse generated by 93 A1/A2, also causes 94, the A3/A4 monostable to momentarily drive transistor 2, $T_2$, and Relay 2 (96) (Timer Relay 2). The resulting switch closure causes a system-use-timer, such as an Armitron timer, to start accumulating time at output 98 (Switch for accumulation time). Similarly, when the output voltage at 93, the A1/A2 monostable 95 returns to zero, the B2/B3 monostable 95 generates a momentary switch closure on 96, Relay 2, that stops the timer. Gate B1 is the voltage inverter that allows monostable 95, B2/B3, to operate. The $R_4C_4$ components shown on the diagram control the output of 94, the A3/A4 monostable during turn-on and ensure against transient conditions that might cause a timing error. The hazardous effects of electroshock in water are greatly increased if the animal makes direct contact with an energized metal electrode. In the preferred embodiment the electrodes are surrounded by protective cages of non-conductive materials which prevent animals from accidentally touching the electrodes. This design ensures that the electrical shock is delivered to the animal only through the water and not by direct contact with the conductive electrodes.

As discussed above, some infrared detectors such as the VISONIC SRN- 2000C include a two minute safety reset feature which prevents turn-on until the previously detected animal or other target animal has left the detection area for at least two minutes. If the IR detector is merely that, then a safety reset circuit similar to that in FIG. 10 can be included. This circuit operates by allowing the input pulse from the animal sensor to reset the binary divider 101 and transmit a pulse through the inverting gate 102 and logic gate 103 to the timer control. The reset line 106 of the binary divider 101 also starts the astable oscillator 104 by removing the voltage bias on the oscillator control line 105. An 8.53 Hz oscillator (104) then drives the binary divider 101 for a time equal to 1024 oscillations (2 minutes) and then the voltage bias turns on the control line 105 and stops the oscillator 104. Any extra signals from the animal sensor that occur while the oscillator operates resets (at 106) the binary divider 101 to zero and the counting at the divider 101 starts over. These extra signals are blocked from entering the timer control by the logic gate 103.

Figure 11:
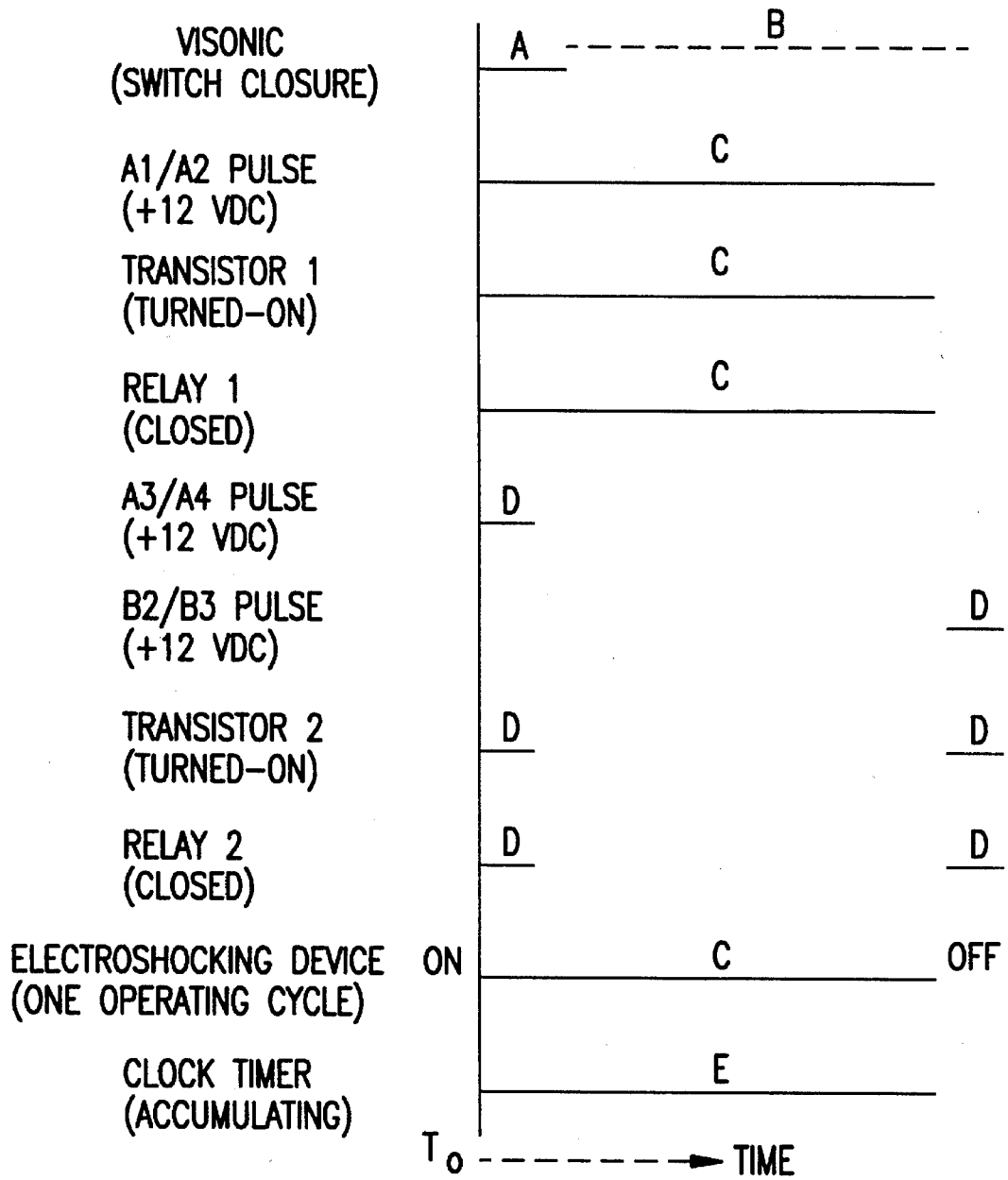
FIG. 11 shows a typical set of timing charts showing simultaneous timing sequences for the invention embodiment of FIG. 9.

A timing sequence associated with FIG. 9 is shown in FIG. 11. Period A is the switch closure period resulting from the infrared sensor. Period B represents the period that the electroshocking apparatus cannot be retriggered due to an animal remaining in the field of detection. The device will not retrigger until the animal leaves the field for the (pre)set period (two minutes in a preferred embodiment). Period C is the period that the inverter is on and electroshocking voltage is applied to the electrodes. In the preferred embodiment, the period is set for about 30 seconds. Period D are the electrical pulses, having a time duration in the preferred embodiment of less than 0.1 second, which are generated to turn the clock timer on and off. Period E is the clock timer which accumulates the total time that the electroshocking device has operated (E=N×C where N is the number of times the device has been actuated. In the disclosed embodiment, the output signals from the three monostable oscillators A1/A2, A3/A4 and B2/B3) are voltage pulses having an amplitude of about 12 volts, the supply voltage. The duration of the pulse is about 30 seconds for A1/A2 and less than 0.1 seconds for A3/A4 and B2/B3. The voltage waveform for these pulses is basically square wave—0 to supply voltage. It should be understood that the embodiments shown are merely typical. Variation within skill of those of ordinary skill in the art would be obvious therefrom.

TABLE I

POWER DENSITY THRESHOLDS

| Animal: | Exposure | Electorshock Response microwatts/cubic centimeter | | |
|---|---|---|---|---|
| | | Excitation | Stun | Death |
| Fish: | | | | |
| Goldfish | 5 sec. | 2.1 | 126 | — |
| Catfish | 5 sec. | 0.3 | 3 | — |
| Grass carp | 5 sec. | 0.3 | 20 | — |
| Mussles | | | | |
| Zebra Veligers* | 0.1 sec. | 1800 | .5 × 10⁶ | 25 × 10⁶ |
| Zebra adults** | continuous | | | 3200 |
| Cyclops adults* | 10 sec. | 98 | | .4 × 10⁶ |
| Norway Rats | 5 sec. | 60*** | | >1000 |
| Ducks | 1 min. | 300**** | | |
| Geese | 1 min. | 300**** | | |

These experiments were in water conductivity range of 100 to 400 microsiemens/cm and the applied electrical waveform was an alternating current of 50 to 60 Hz.
*Data collected by Kerpichenko
**Data collectged by Shentiakov
***Highly agitated
****Left immediately

I claim:

1. An electroshocking non-lethal energy-efficient specific-mammal and warm-blooded species repelling device, discouraging the proximity of said mammals, birds, and warm-blooded species in a zone of a natural or artificial waterway, said device comprising:

(a) at least one electrode protruding below but near the surface of the waterway, and located in said zone;

(b) a return path;

(c) a thermal/electromagnetic/light-emissive-energy-reception-based detector of said mammal, bird, or warm-blooded species which outputs a signal indicative of the presence of said mammal, bird, or warm-blooded species in said zone;

(d) an electrical energy source having an output, an input, and an energy means, said source output provides a non-constant electroshocking voltage at such scientifically predetermined: voltage waveform, length of time, and power density specification to assure nonlethal but repelling effect upon said mammal, bird or warm-blooded species, said detector being connected to said source input for transmitting said signal thereto;

(e) electrical connections connecting (i) said at least one electrode, and (ii) said return path to said output of said electrical energy source;

and which upon receiving said signal occurring at said input, said source applies said voltage to said at least one electrode to repel said mammal, bird or warm-blooded species for said length of time.

2. The device of claim 1, wherein said energy source includes a means to store energy in said energy means.

3. The device of claim 2, further comprising a means to regenerate the stored energy of said energy means.

4. The device of claim 3, wherein said regeneration means is at least one solar cell and said energy means is at least one rechargeable battery which is electrically connected to said regeneration means.

5. The invention of claim 1 wherein said energy means comprises a D.C. energy source and an inverter which are electrically connected.

6. The invention of claim 1 wherein said detector is an infrared detector.

7. The invention of claim 1 wherein there are a plurality of electrodes, and further comprising a Multiplexer electrically connected to and functionally before said electrodes, and where said Multiplexer applies said non-constant electroshocking voltage on a time-shared basis to groupings of said electrodes.

8. The invention of claim 1, said electrical energy source further comprising duty-cycle means wherein said duty-cycle means alternatively in some time ratio is: (a) substantially transmitting said electroshocking voltage, alternating with (b) substantially not transmitting said electroshocking voltage.

9. An electroshocking non-lethal energy-efficient specific-mammal and warm blooded species repelling device, discouraging the proximity of said mammals, birds, and warm-blooded species in a zone of a natural or artificial waterway, said device comprising:

(a) at least one electrode protruding below but near the surface of the waterway, and located in said zone;

(b) a return path;

(c) a detector of said mammal, bird, or warm-blooded species which outputs a signal indicative of the presence of said mammal, bird, or warm-blooded species in said zone;

(d) an electrical energy source having an output, an input, and an energy means, said source output provides a non-constant electroshocking voltage at such scientifically predetermined: voltage waveform, length of time, and power density specification to assure nonlethal but repelling effect upon said mammal, bird or warm-blooded species, said detector being connected to said source input for transmitting said signal thereto;

(e) electrical connections connecting (i) said at least one electrode, and (ii) said return path to said output of said electrical energy source;

and which upon receiving said signal occurring at said input, said source applies said voltage to said at least one electrode to repel said mammal, bird or warm-blooded species for said length of time;

said device further comprising a delay means electrically connected to said detector which measures the non-presence time of said detector after completion of the previous said signal, said delay means preventing said electroshocking voltage from being re-applied to said at least one said electrode after said length of time until said non-presence time reaches a predetermined value.

10. The invention of claim 9 wherein said delay means comprises:

(a) a momentary input from said detector, said input having an output, receiving a momentary input signal and producing in response at said output an animal presence signal;

(b) an astable oscillator having a first input, a second input, and an output, said output connected to said second input;

(c) a binary divider having an input, a counter having a binary count and a capacity, a reset line, and an output, said output connected to said first input of said oscillator, said reset line connected to said output of said momentary input, said count of said counter being changed by 1 by each pulse at the input of said divider, said divider producing a "0" at its output upon reset said animal presence signal, and producing a "1" at its output upon said counter reaching capacity;

(d) an inverting gate having an input and an output, said input connected to said output of said momentary input;

(e) a logic gate having a first input, a second input, and an output, said output connected to said input of said electrical energy source, said first input connected to said output of said divider, said second input connected to said output of said inverting gate;

and wherein: said oscillator produces a specific number of pulses at its output upon said animal presence signal; said momentary input producing said presence signal causes said binary count of said counter of said divider to be reset to zero; and resulting in a repeatable two-part sequence wherein: (i) the first said animal presence signal producing a pulse at said output of said logic gate, and (ii) said logic gate thereafter producing a pulse only upon said count of said counter reaching said capacity.

11. An electroshocking non-lethal energy-efficient specific-mammal and warm blooded species repelling device, discouraging the proximity of said mammals, birds, and warm-blooded species in a zone of a natural or artificial waterway, said device comprising:

(a) at least one electrode protruding below but near the surface of the waterway, and located in said zone;

(b) a return path;

(c) a detector of said mammal, bird, or warm-blooded species which outputs a signal indicative of the presence of said mammal, bird, or warm-blooded species in said zone;

(d) an electrical energy source having an output, an input, and an energy means, said source output provides a non-constant electroshocking voltage at such scientifically predetermined: voltage waveform, length of time, and power density specification to assure nonlethal but repelling effect upon said mammal, bird or warm-blooded species, said detector being connected to said source input for transmitting said signal thereto;

(e) electrical connections connecting (i) said at least one electrode, and (ii) said return path to said output of said electrical energy source;

and which upon receiving said signal occurring at said input, said source applies said voltage to said at least one electrode to repel said mammal, bird or warm-blooded species for said length of time;

said device and wherein said length of time is determined by an ON-TIME Circuit, said Circuit comprising a monostable oscillator having an output, said oscillator producing a pulse of said length of time at said output.

12. The invention of claim 11, wherein said oscillator comprises:

(a) a first NOR having a first input, a second input, and an output, said first input connected to said detector;

(b) a capacitor having an input and an output, said input being the output of said first NOR;

(c) a resistor having a source lead and a load lead, said source lead connected to a DC source, said load lead connected to said output of said capacitor;

(d) a second NOR having a first input, a second input, and an output, said inputs both being connected to said load lead of said resistor, said output of said second NOR connected to said second input of said first NOR;

and wherein said oscillator produces a pulse of said length in duration, said duration substantially determined by the multiplication of the value of resistance of said resistor and the capacitance of said capacitance.

13. The invention of claim 11 wherein said ON-TIME circuit further comprises an electronic switch having a gate, said gate connected to said output of said oscillator.

14. The invention of claim 13 wherein said electronic switch is a transistor.

15. The invention of claim 13 wherein said electronic switch is a FET.

* * * * *